(12) United States Patent
Groves

(10) Patent No.: US 9,001,956 B2
(45) Date of Patent: Apr. 7, 2015

(54) NEUTRON GENERATOR

(75) Inventor: Joel L. Groves, Leonia, NJ (US)

(73) Assignee: Schlumberger Technology Corporation, Sugar Land, TX (US)

( * ) Notice: Subject to any disclaimer, the term of this patent is extended or adjusted under 35 U.S.C. 154(b) by 0 days.

(21) Appl. No.: 11/946,344

(22) Filed: Nov. 28, 2007

(65) Prior Publication Data

US 2009/0135982 A1   May 28, 2009

(51) Int. Cl.
*H05H 3/06* (2006.01)

(52) U.S. Cl.
CPC ........ *H05H 3/06* (2013.01); *H01J 2201/30469* (2013.01)

(58) Field of Classification Search
CPC .............. G21B 1/00; G21B 1/11; G21B 1/19; G21K 1/00
USPC .................. 376/108, 114, 109; 250/288, 266
See application file for complete search history.

(56) References Cited

U.S. PATENT DOCUMENTS

| | | | |
|---|---|---|---|
| 3,546,512 A | 12/1970 | Frentrop | |
| 3,756,682 A | 9/1973 | Frentrop | |
| 4,600,838 A | 7/1986 | Steinman et al. | |
| 4,687,938 A * | 8/1987 | Tamura et al. | 250/423 F |
| 4,721,853 A | 1/1988 | Wraight | |
| 4,794,792 A | 1/1989 | Flaum et al. | |
| 4,990,774 A * | 2/1991 | Smith et al. | 250/269.5 |
| 5,293,410 A * | 3/1994 | Chen et al. | 376/108 |

(Continued)

FOREIGN PATENT DOCUMENTS

| CN | 1793607 A | 6/2006 |
|---|---|---|
| EP | 1128394 A2 | 8/2001 |
| WO | WO 2008030212 A2 * | 3/2008 |

OTHER PUBLICATIONS

Gomer "Field Emission and Field Ionization," Harvard Monographs in Applied Science, No. 9, Harvard University Press, Cambridge, Massachusetts, pp. 10-11, 30-33, and 42-47.

(Continued)

*Primary Examiner* — Jack W Keith
*Assistant Examiner* — Marshall O'Connor
(74) *Attorney, Agent, or Firm* — Cathy Hewitt

(57) ABSTRACT

A neutron generator includes an ion source disposed in a pressurized environment containing an ionizable gas. The ion source includes a substrate with a bundle of carbon nanotubes extending therefrom. The ends of the nanotubes are spaced from a grid. Ion source voltage supply circuitry supplies a positive voltage potential between the substrate and the grid of the ion source to cause ionization of the ionizable gas and emission of ions through the grid. An ion accelerator section is disposed between the ion source and a target. The ion accelerator section accelerates ions that pass through the grid towards the target such that collisions of the ions with the target cause the target to generate and emit neutrons therefrom. The ion source, accelerator section and target are housed in a sealed tube and preferably the carbon nanotubes of the bundle are highly ordered with at least $10^6$ carbon nanotubes per $cm^2$ that extend in a direction substantially parallel to the central axis of the tube. The neutron generator provides gas ionization at much higher atomic to molecular ratio that the prior art, which allows for small compact size designs suitable for logging tools that are used in space-constrained downhole environments.

16 Claims, 2 Drawing Sheets

(56) References Cited

U.S. PATENT DOCUMENTS

| | | | |
|---|---|---|---|
| 5,313,504 A | 5/1994 | Czirr | |
| 2003/0122085 A1 | 7/2003 | Stengl et al. | |
| 2003/0184235 A1 | 10/2003 | Nakamura | |
| 2005/0098720 A1* | 5/2005 | Traynor et al. | 250/288 |
| 2006/0280524 A1 | 12/2006 | Hays et al. | |

OTHER PUBLICATIONS

Kruithof et al. "Determining of the Townsend Ionization Coefficient a for Mixtures of Neon and Argon," Physica IV, No. 6, Jun. 1937, pp. 430-449.

Levi-Setti "Proton Scanning Microscopy: Feasibilty and Promise," Scanning Electron Microscopy, Part I, Proceedings of the Seventh Annual Scanning Electron Microscop Symposium, IIT Research Institute, Chicago, Illinois, Apr. 1974, pp. 125-134.

Modi et al. "Miniaturized gas ionization sensors using carbon nanotubes," Letters to Nature, NATURE, vol. 424, Jul. 10, 2003, pp. 171-174.

Muller "Field Desorption," Physical Review, vol. 102, No. 3, May 1, 1956, 9 pages.

Tawara et al. "Cross Sections and Related Data for Electron Collisions with Hydrogen Molecules and Molecular Ions," J. Phys. Chem. Ref. Data, vol. 19, No. 3, 1990, pp. 617-636.

International Search Report and Written Opinion for International Application No. PCT/US2008/084552 dated Feb. 16, 2009.

Russian Office Action for Russian Application No. RU2010126076 dated Dec. 4, 2012.

Decision on Grant Patent for Invention for Russian Application No. 2010126076/07(037225) dated Mar. 26, 2013.

Chinese First Office Action for Chinese Patent Application No. 200810182001.7 dated Sep. 28, 2011.

Chinese Second Office Action for Chinese Patent Application No. 200810182001.7 dated Mar. 9, 2012.

* cited by examiner

NEUTRON GENERATOR

BACKGROUND OF THE INVENTION

1. Field of the Invention

This invention relates to neutron generating systems and more particularly pertains to a new and improved neutron generator especially adapted to traverse the narrow confines of a well or borehole, although useful in a variety of other applications. Since a neutron generator embodying the invention is ideally suited to the needs of well logging services, it will be described in that connection.

2. The Related Art

The use of a generator of high energy neutrons has been known for a long time for neutron-gamma ray or neutron-neutron logging. Neutron generators used in oil well logging tools usually require controlled low pressure atmospheres and high intensity magnetic fields. Accordingly, for illustrative purposes, the invention is described in more complete detail in connection with a neutron generator suitable for use in a well logging tool.

Neutron generators usually have three major features:
  (i) a gas source to supply the reacting substances, such as deuterium ($H^2$) and tritium ($H^3$);
  (ii) an ion source that strips electrons from the gas molecules, thus generating positively charged ions; and
  (iii) an accelerating gap which impels the ions to a target with such energy that the bombarding ions collide with deuterium or tritium nuclei of the target to generate and emit neutrons therefrom.

Ordinarily, negative electrons and positively charged ions are produced through electron and uncharged gas molecule collisions within the ion source. Anode and cathode electrodes of different potential contribute to ion production by accelerating electrons to energy higher than the ionization threshold. Collisions of those energetic electrons with gas molecules produce additional ions and electrons. At the same time, some electrons and ions are lost to the anode and cathode. In this manner, the positive and negative charges inside the ion source approach equilibrium. Collision efficiency can be increased by lengthening the distance that the electrons travel within the ion source before they are neutralized by striking a positive electrode. One known path lengthening technique establishes a magnetic field which is perpendicular to the aforementioned electric field. The combined magnetic and electrical fields cause the electrons to describe a helical path within the ion source which substantially increases the distance traveled by the electrons within the ion source and thus enhances the collision efficiency of the device. This type of ion source, called a "Penning ion source", has been known as early as 1937; see for example the article by F. M. Penning and J. H. A. Moubis in Physica 4 (1937) 1190. Examples of neutron generators including Penning ion sources used in logging tools are described e.g. in U.S. Pat. No. 3,546,512 or U.S. Pat. No. 3,756,682 both assigned to Schlumberger Technology Corporation.

However, neutron generators using Penning ion sources used in logging tools suffer from limited collision efficiency and a relatively low atomic to molecular ion ratio of the ion source. In order to deal with such inefficiencies, ion sources employ designs that are intended to lengthen or widen the electrons path. Such designs are relatively cumbersome and increase the overall dimensions and/or weight of the neutron generator. This is of concern in a logging tool where the tool must be delivered over long distances into the downhole environment where room is limited.

SUMMARY OF THE INVENTION

The neutron generator of the present invention includes an ion source disposed in a pressurized environment containing an ionizable gas. The ion source includes a substrate with a bundle of carbon nanotubes extending therefrom. The ends of the nanotubes are spaced from a grid. Ion source voltage supply circuitry supplies a positive voltage potential between the substrate and the grid of the ion source to cause ionization of the ionizable gas and emission of ions through the grid. An ion accelerator section is disposed between the ion source and a target. The ion accelerator section accelerates ions passing through the grid towards the target such that collisions of the ions with the target cause the target to generate and emit neutrons therefrom. In the preferred embodiment, the ion source, accelerator section and target are housed in a sealed tube and the carbon nanotubes of the bundle are highly ordered with at least $10^6$ carbon nanotubes per $cm^2$ that extend in a direction substantially parallel to the central axis of the tube.

The neutron generator of the present invention provides gas ionization at a much higher atomic to molecular ratio than the prior art neutron generators. This allows for small compact size designs suitable for logging tools that are used in a downhole environment where space is limited. In such applications, the neutron generator and at least one radiation detector are housed within a sonde for traversing a borehole and investigating earth formations surrounding the borehole.

Additional objects and advantages of the invention will become apparent to those skilled in the art upon reference to the detailed description taken in conjunction with the provided figures.

DETAILED DESCRIPTION OF THE PREFERRED EMBODIMENTS

Figure 1:
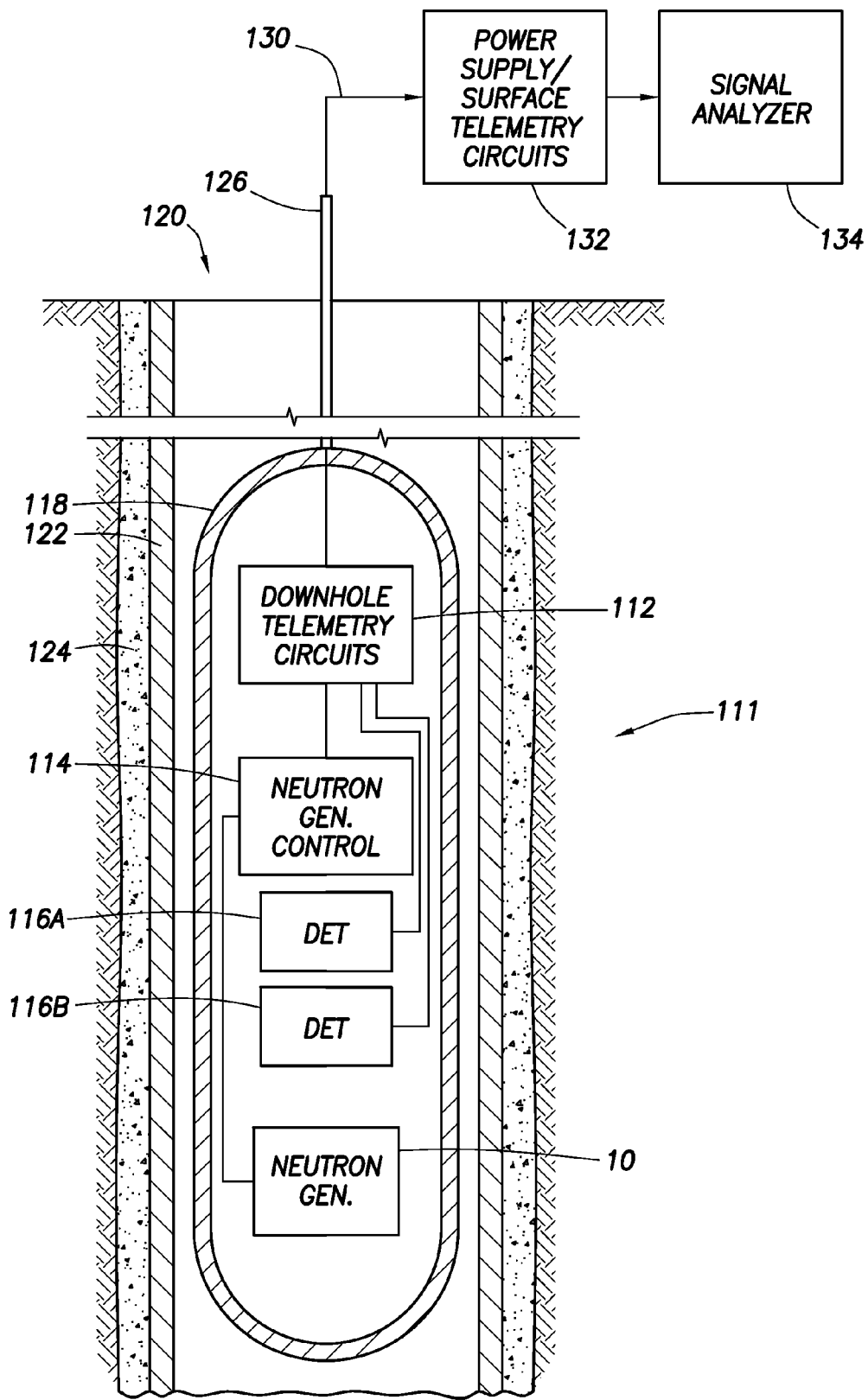
FIG. 1 is a schematic view of a downhole logging tool and associated surface instrumentation.
Figure 2B:
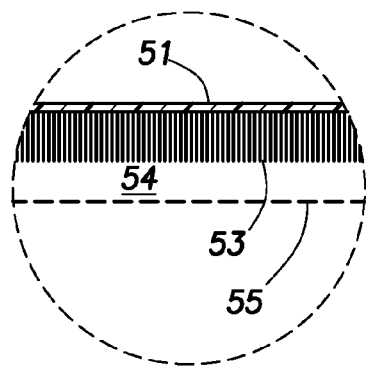
FIG. 2B is a partial schematic representation of the ion source of the neutron generator of FIG. 2A.
Figure 2A:
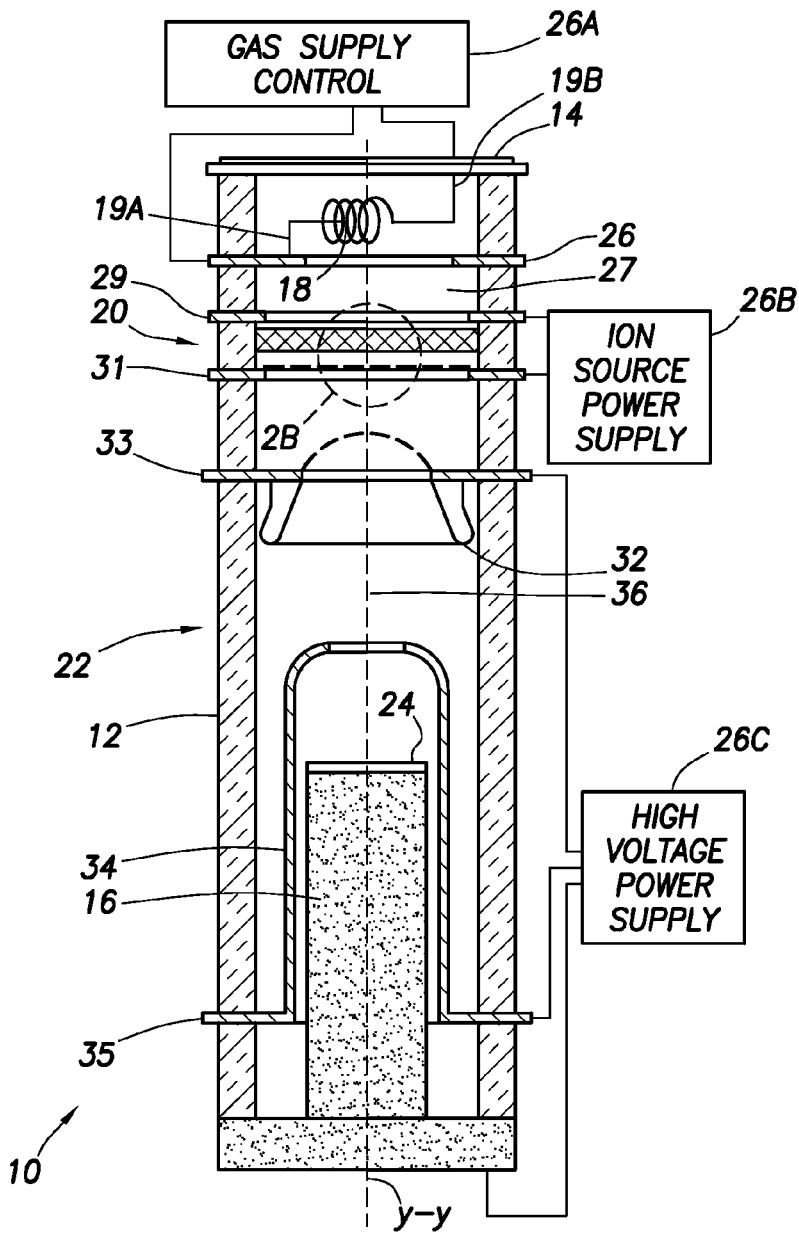
FIG. 2A is a cross section view of a neutron generator of the logging tool of FIG. 1 in accordance with the present invention.

Turning now to FIGS. 1 and 2A, the neutron generator 10 in accordance with the present invention may be used as part of a logging tool 111 as shown. The neutron generator 10 includes a sealed insulating hollow cylindrical tube 12 that houses gas supply means 18, an ton source 20, an ion accelerator section 22 and a target 24 as described below in more detail. Typically, the tube 12 is enclosed in a metal housing (not shown) which is filled with a dielectric media to insulate the high voltage elements of the tube 12. The metal housing together with electrical components, e.g., downhole telemetry circuits 112, neutron generator control circuitry 114 (which include gas supply control circuitry 26A, ion source power supply circuitry 26B, and high voltage power supply circuitry 26C as described below), at least one radiation detector (for example, two shown as 116A, 116B) and possibly other system components are housed in a sonde 118 that is configured to be drawn through a borehole 120. The borehole 120 is illustrated as including a steel casing 122 and a surrounding cement annulus 124. The sonde 118 is typically suspended in the borehole 120 by cable, coiled tubing or other means (labeled 126). A multi-conductor power supply cable 130 is carried by the suspension means 126 and provides electrical power from the surface (provided by power supply circuitry 132) downhole to the sonde 118 and the electrical components therein, which include the downhole telemetry circuits 112, neutron generator control circuitry 114, radiation detectors 116A, 116B, and the neutron generator 10. The neutron generator 10 is operated to emit neutrons in order to irradiate the formation adjacent the sonde 118 with such neutrons. Neutrons and/or photons that return from the formation are detected by the radiation detectors 116A, 116B. The output of the radiation detectors 116A, 116B are communicated to the surface by cooperation of downhole telemetry circuitry 112 and surface telemetry circuitry 132, and analyzed by Signal Analyzer 134 to obtain information regarding the formation. More particularly, oil, gas, water and the elements of the geological formations possess distinctive radiation signatures that permit identification of such geological formations. The neutron generator 10 of the present invention can be used in conjunction with other logging tools, such as those described in U.S. Pat. Nos. 4,794,792; 4,721,853; and 4,600,838; and 5,313,504, which are herein incorporated by reference in their entireties.

As shown in FIG. 2A, the neutron generator 10 includes a hollow cylindrical tube 12 made of an insulating material such as alumina ceramic or glass. A transverse header 14 and the target electrode 16 close the ends of the tube 12 to provide a gas-tight cylindrical envelope inside the tube 12. Gas supply means 18 is disposed preferably along the central axis of the tube 12 between the header 14 and a conductive flange 26. In the preferred embodiment, the gas supply means 18 comprises a helically wound filament of metal (such as tungsten) coated with a metal hydride film (such as a hydride of titanium, scandium, and/or zirconium) or the like. The ends 19A, 19B of the filament are connected to gas supply control circuitry 26A preferably via the conductive flange 26 and the header 14, respectively. The gas supply control circuitry 26A heats (or cools) the filament 18 and the metal hydride film thereon by electric current supplied to the filament 18. The heating (or cooling) of the metal hydride film of the filament 18 emits (or absorbs) deuterium and/or tritium in gaseous form to thereby provide a supply of these gases and to control gas pressure during generator operation.

The gases emitted by the gas supply means 18 diffuse through a space 27 between the gas supply means 18 and the ion source 20 and enter the ion source 20. As best shown in FIG. 2B, the ion source 20 includes a conductive substrate 51 upon which is formed a bundle of carbon nanotubes 53. The carbon nanotubes of the bundle 53 may comprise single-walled carbon nanotubes, multi-walled carbon nanotubes or a combination thereof. A single-wall carbon nanotube is a cylindrical structure with a diameter on the order of a nanometer and an annular side-wall realized from a one-atom sheet of graphite (called "graphene"). A multi-walled carbon nanotube includes multiple layers of graphite roiled in on themselves to form a tube shape. In the preferred embodiment, the carbon nanotubes of the bundle 53 are formed on the conductive substrate 51 by chemical vapor deposition whereby catalyst nanoparticles are placed at well-defined surface sites on the substrate and then heated at high temperatures in a reactor with flowing hydrocarbon gases. Carbon nanotubes grow from the catalyst particles via catalytic dissociation of the hydrocarbon molecules and the catalyst particles, and dissolution of carbon atoms info the particle. Upon saturation, carbon atoms precipitate from the catalyst particle to thereby form the tubular carbon structure. In the preferred embodiment, the substrate 51 is oriented substantially transverse to the central axis of the tube 12, while the carbon nanotubes of the bundle 53 are highly ordered with at least $10^6$ carbon nanotubes per $cm^2$ that extend in a direction substantially parallel to the central axis y-y of the tube 12. A grid 55 extends transverse to the central axis of the tube 12. The grid 55 can be realized from nickel, molybdenum or any conductive material compatible with the ionized hydrogen environment inside the tube 12.

The substrate 51 and the grid 55 of the ion source 20 are preferably supported and electrically coupled to conductive flanges 29, 31, respectively, which are electrically connected to ion source power supply circuitry 26B. During operation of the generator 10, the gases emitted by the gas supply means 18 diffuse through holes or other voids (not shown) in the substrate 51 and the carbon nanotube bundle 53 and enter the space 54 between the tips of the carbon nanotube bundle 53 and the grid 55. The ton source power supply circuitry 26B supplies a positive voltage potential between the substrate 51 and the grid 55 to cause ionization of the gas in the space 54 and emission of the resulting ions through the grid 55.

Ionization of the gas at or near the tips of the carbon nanotube bundle can occur if the electric field gradient between the respective tips of the carbon nanotube bundle 53 and the grid 55 is sufficiently strong and the respective tips of the carbon nanotube bundle 53 are at a high positive potential relative to the grid 55. If a gas molecule moves into the region of the high electric field gradient, an electron may tunnel from the molecule to the tip of a carbon nanotube of the carbon nanotube bundle 53 where it is transported through the nanotube to the substrate 51 and then to the circuitry 26B. The resulting ion is then accelerated away from the tip of the carbon nanotube and through the grid 55 by the high electric field gradient. The magnitude of the positive voltage potential difference between the substrate 51 and the grid 55 as well as the spacing between the tips of the carbon nanotube bundle 53 and the grid 55 controls the electrical field gradient that causes ionization and ion emission. Preferably, the spacing between the tips of the carbon nanotube bundle 53 and the grid 55 is set such that a positive voltage potential difference between the substrate 51 and the grid 55 on the order of 1 kV creates 100 µA of ion current at a gas pressure on the order of 1 mTorr. Such spacing is expected to be less than 1 mm in order to achieve such ion current.

The ions that are created near the tips of the carbon nanotubes of the nanotube bundle 53 and pass through the grid 55 enter an ion accelerator section 22 that impels the ions to target 24 with such energy that the bombarding ions collide with deuterium or tritium target nuclei of the target 24 to generate and emit neutrons therefrom. In the illustrative embodiment shown, the ion accelerator section 22 includes an extracting electrode 32 supported by and electrically connected to a conductive support flange 33 as well as a suppressor electrode 34 supported by and electrically connected to a conductive support flange 35. High voltage power supply circuitry 26C is electrically coupled to the electrodes 32, 34 of the accelerator section 22 by the flanges 33, 35, respectively, and to the target electrode 16. During operation, the high voltage power supply circuitry 26C provides a large positive voltage difference (typically between 80 to 180 kV) between the extracting electrode 32 and the suppressor electrode 34/target 24 in order to accelerate ions toward the target 24 with sufficient energy to cause the bombarding ions to generate and emit neutrons from the target 24. Such acceleration results from the high electric field gradient in the gap 36 between the extracting electrode 32 and the suppressor electrode 34/target 24. The suppressor electrode 34 is preferably realized by a concave member facing toward the target 24 with a central aperture that allows for ions to pass therethrough to the target 24. The suppressor electrode 34 acts to prevent electrons from being extracted from the target 24 upon ion bombardment (these extracted electrons commonly referred to as secondary electrons). To do so, the high voltage power supply circuitry 26C supplies a negative voltage potential difference between the suppressor electrode 34 and the target 24 typically in the range between 500V to 2 kV. The extracting electrode 32 is supplied with a negative voltage potential relative to the grid 55 (typically on the order of 0.1 to 5 kV) in order to induce ion flow into the accelerator section 22.

In an alternate embodiment, the extracting electrode 32 can be omitted. In this case, a large positive voltage difference between the grid 55 of the ion source and the suppressor electrode 34/target 24 is used to accelerate ions toward the target 24 with sufficient energy to cause the bombarding ions to generate and emit neutrons from the target 24.

The target 24 preferably comprises a thin metal hydride film of titanium, scandium or zirconium deposited on the surface of the target electrode 16 facing ion source 20. Alternatively, the target 24 can be realized by a carbon button. Initial bombardment of the carbon button produces relatively few neutrons. Over time, the impinging ions penetrate and are held in the lattice of the carbon target in sufficient quantity to initiate neutron generating reactions between the bombarding ions and the target nuclei as well as to replenish the target with nuclei. Other suitable targets can also be used.

The ion source power supply circuitry 26B and the high voltage power supply circuitry 26C can be adapted to provide controlled output of neutrons continuously or in recurrent bursts (e.g., a pulsed output mode). The burst rate and durations can be controlled by a controller or other suitable logic.

The gas supply control circuitry 26A preferably regulates the current supplied to the gas supply means 18 in order to control the gas pressure inside the sealed tube 12. Such regulation is typically realized by a feedback path (not shown) provided between the high voltage power supply circuitry 26C (or other output monitoring circuitry) and the gas supply control circuitry 26A. This feedback path carries a signal that tracks the neutron output. In the event that the neutron output falls below a desired value, the gas supply control circuitry 26A can increase the gas pressure inside the sealed tube to increase the neutron output. In the event that the neutron output rises above the desired value, the gas supply control circuitry 26A can decrease the gas pressure inside the sealed tube to decrease the neutron output.

Advantageously, the neutron generator of the present invention provides gas ionization at much higher atomic to molecular ratio that the prior art neutron generators based on Penning ion sources. This allows for small compact size designs suitable for logging tools that are used in a downhole environment where space is limited.

There has been described and illustrated herein an embodiment of a neutron generator, a method of operating same as well as a logging tool based thereon. While a particular embodiment of the invention has been described, it is not intended that the invention be limited thereto, as it is intended that the invention be as broad in scope as the art will allow and that the specification be read likewise. Thus, while particular logging tools have been disclosed, it will be appreciated that the neutron generator of the present invention can be used in other logging tools as well as other applications. In addition, while particular configurations have been disclosed in reference to the neutron generator of the present invention, it will be appreciated that other configurations could be used as well. It will therefore be appreciated by those skilled in the art that yet other modifications could be made to the provided invention without deviating from its spirit and scope as claimed.

What is claimed is:

1. A neutron generator comprising:
    an insulative housing defining a sealed chamber having a central axis;
    an ionizable gas supply carried by said insulative housing to provide an ionizable gas within the sealed chamber;
    an ion source disposed in the sealed chamber adjacent said ionizable gas supply and defining a gas diffusion space therebetween, the ion source including a grid and a substrate with a bundle of carbon nanotubes extending therefrom, to ends thereof, in a direction substantially parallel to the central axis of the sealed chamber, away from the diffusion space, and that are spaced from said grid;
    conductive flanges carried by said insulative housing and respectively coupled to said grid and said substrate;
    an ion source voltage supply electrically coupled to said substrate and said grid via said respective conductive flanges to supply a positive voltage potential between said substrate and said grid, thereby causing electrons from gas molecules of the ionizable gas to quantum tunnel to the ends of the nanotubes so as to cause ionization of said ionizable gas proximate the ends of the nanotubes;
    a target disposed within the sealed chamber; and
    an accelerator section disposed within the sealed chamber between said ion source and said target that accelerates ions that pass through said grid towards said target such that collisions of ions with said target cause said target to generate and emit neutrons therefrom.

2. A neutron generator according to claim 1, further comprising:
    power supply, operably coupled to at least said target, supplying to said target voltage signals that accelerate ions toward said target.

3. A neutron generator according to claim 1, wherein: said ionizable gas supply includes a filament and a current source that heats said filament.

4. A neutron generator according to claim 1, wherein: said insulative housing comprises a glass or ceramic tubular housing.

5. A neutron generator according to claim 1, wherein: said bundle of carbon nanotubes comprises an array having at least $10^6$ carbon nanotubes per $cm^2$ that extend in a direction substantially parallel to a central axis of each tube.

6. A neutron generator according to claim 1, wherein:
    said bundle of carbon nanotubes of said ion source comprises single-walled carbon nanotubes, multi-walled carbon nanotubes, or a combination thereof.

7. A neutron generator according to claim 1, wherein: said bundle of carbon nanotubes includes at least $10^6$ carbon nanotubes per $cm^2$.

8. A neutron generator according to claim 7, wherein: said ion source voltage supply supplies a positive voltage potential between said substrate and said grid on the order of 1 kV.

9. A neutron generator according to claim 8, wherein:
    the ends of said bundle of carbon nanotubes are spaced from said grid by a gap that is less than 1 mm.

10. A neutron generator according to claim 9, wherein:
    said ion source is capable of creating an ion current of at least 100 µA at a gas pressure of 1 mTorr.

11. A neutron generator according to claim 2, wherein: said accelerator section includes an extracting electrode and said power supply supplies to said extracting electrode a positive potential voltage signal relative to said target.

12. A neutron generator according to claim 2, wherein: said accelerator section includes a suppressor electrode and said power supply supplies to said suppressor electrode a negative potential voltage signal relative to said target.

13. A neutron generator according to claim 1, wherein: said accelerator section is realized by applying a positive voltage potential signal to said grid relative to said target.

14. A neutron generator according to claim 1, wherein: the ionizable gas comprises at least one hydrogen isotope.

15. A neutron generator according to claim 4, wherein: said at least one hydrogen isotope is selected from the group including deuterium ($H^2$), tritium ($H^3$), and a combination thereof.

16. A logging tool for investigating earth formations surrounding a borehole, comprising:
   a sonde configured to traverse the borehole;
   at least one detector disposed in the sonde; and
   a neutron generator disposed in the sonde, the neutron generator including
      an insulative housing defining a sealed chamber having a central axis,
      an ionizable gas supply carried by said insulative housing to provide an ionizable gas within the sealed chamber,
      an ion source disposed in the sealed chamber adjacent said ionizable gas supply and defining a gas diffusion space therebetween, the ion source including a grid and a substrate with a bundle of carbon nanotubes extending therefrom, to ends thereof, in a direction substantially parallel to the central axis of the sealed chamber, away from the diffusion space, and that are spaced from said grid,
      conductive flanges carried by said insulative housing and respectively coupled to said grid and said substrate,
      an ion source voltage supply electrically coupled to said substrate and said grid via said respective conductive flanges to supply a positive voltage potential between said substrate and said grid, thereby causing electrons from gas molecules of the ionizable gas to quantum tunnel to the ends of the nanotubes so as to cause ionization of said ionizable gas proximate the ends of the nanotubes, and emission of ions through said grid,
      a target disposed within the sealed chamber, and
      an accelerator section disposed within the sealed chamber between said ion source and said target that accelerates ions that pass through said grid towards said target such that collisions of ions with said target cause said target to generate and emit neutrons therefrom.

* * * * *